Oct. 28, 1924.
C. A. LEWIS
AIRCRAFT LANDING GEAR
Filed June 27, 1923
1,513,053
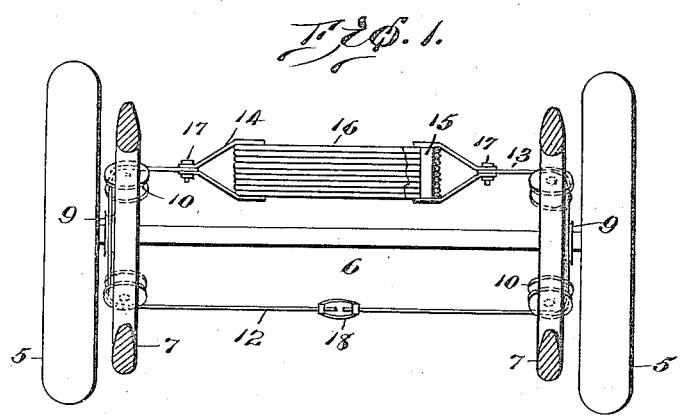
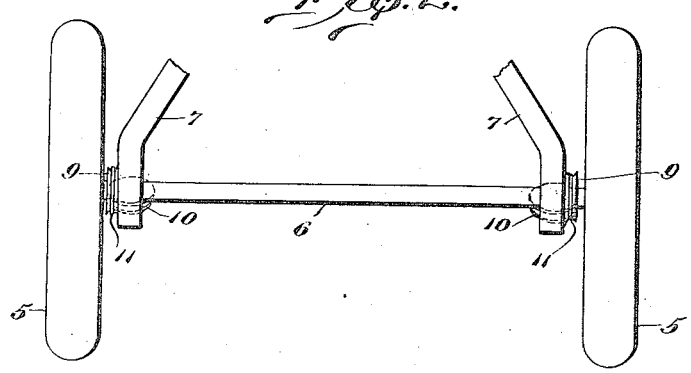
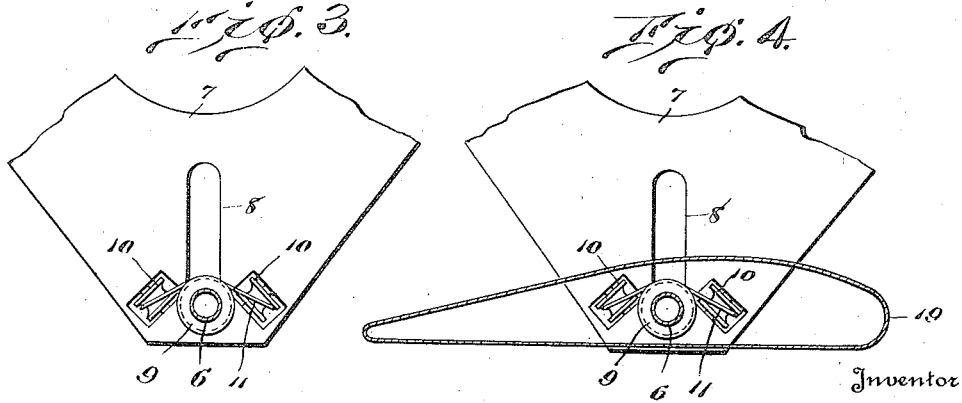
Inventor
Charles A. Lewis,
By Robert H. Young
Attorney Patented Oct. 28, 1924.

1,513,053

UNITED STATES PATENT OFFICE.

CHARLES A. LEWIS, OF DAYTON, OHIO.

AIRCRAFT LANDING GEAR.

Application filed June 27, 1923. Serial No. 648,045.

*To all whom it may concern:*

Be it known that I, CHARLES A. LEWIS, a citizen of the United States, residing at Dayton, in the county of Montgomery and State of Ohio, have invented certain new and useful Improvements in Aircraft Landing Gears, of which the following is a specification.

This invention relates to aircraft landing gear and particularly to the means of absorbing jars and shocks while launching the machine in flight and especially when making a landing.

One of the main objects of the present invention is to provide in conjunction with the axle and struts of the landing gear of an aircraft, shock-absorbing means embodying a cable or the equivalent thereof, having leading and trailing runs extending in parallel relation to each other and to the axle and embodying in one or both of said runs a shock-absorbing unit, the construction and arrangement of the parts referred to adapting the axle, shock-absorbing unit and said leading and trailing runs of the cable to be enclosed in a streamlined fairing, thereby to a considerable extent reducing the head resistance of the machine.

The construction herein shown and described also adapts the shock-absorbing unit to be tensioned to a greater or lesser degree, according to the load imposed thereon by the machine and its load.

Other objects and advantages of the invention will appear as the description proceeds.

The invention consists in the novel construction, combination and arrangement herein fully described, shown and claimed.

In the accompanying drawings.

Figure 1 is a plan view of the improved aircraft landing gear.

Figure 2 is a front elevation of the same.

Figure 3 is an enlarged fragmentary side elevation showing one end of the axle and adjacent strut.

Figure 4 is a vertical cross section through the axle and fairing showing the relation of the shock-absorbing means thereto.

In the form of landing gear shown in the drawings, two ground elements or wheels 5 are employed, altho it will be apparent that skids or floats suitable for water use may be substituted for the wheels 5. The wheels are mounted on an axle 6, which is ordinarily of tubular formation for the sake of lightness.

The struts shown at 7 are of the usual V-type and are formed adjacent to their lower ends with vertical elongated guideways 8 shown in the form of slots extending entirely through the struts. The axle 6 extends adjacent to both of its ends through the guideways 8 as clearly indicated in the drawings and as is the usual practice, the end portions of the axle projecting outside of and beyond the struts 7, where they are encircled by pulleys 9 loosely mounted and rotatable upon the axle. Other guide pulleys 10 are journaled in openings in the lower ends of the struts 7 in front and in rear of the axle 6 and in angular relation to the axle and the pulleys 9.

The shock-absorber comprises a flexible cable 11 or the equivalent thereof, so arranged as to provide leading and trailing runs 12 and 13 parallel to the axle 6 and to each other. The cable 11 passes under the pulleys 10 and over the pulleys 6 as clearly shown in the drawings, providing an arrangement so compact that the ground elements 5 may be mounted on the axle 6 in very close proximity to the struts 7, thereby eliminating the undesirable overhang of the axle ends, which is the cause of the bending moment in the axle.

One of the cable runs, as 13, has incorporated therein a shock-absorbing unit consisting of end clevises 14 around the transverse members 15 of which are wrapped the convolutions of an elastic shock-absorbing cord or rope 16. The clevises 14 are connected by shackle bolts 17 to the adjacent ends of the cable 11. A turnbuckle 18 conveniently mounted in the other run 12 of the cable provides for placing the shock-absorbing unit under greater or less tension in accordance with the load imposed thereon.

A streamlined fairing 19 encloses the axle 6 between the struts 7 and also the leading and trailing runs 12 and 13 of the flexible cable, the shock-absorbing unit and the tensioning turnbuckle 18, while the pulleys 10 are enclosed within the lower ends of the struts 7. By means of the construction and arrangement just described, practically all head resistance of the shock-absorbing elements is eliminated. This is possible on account of the fact that the leading and trailing runs of the cable and the runs of the shock-absorbing cord or rope are all parallel to the axle. The construction also admits of the wheels or ground units being arranged close up to the struts; this eliminates the undesirable overhang of the axle and wheels and consequently eliminates to a great extent the bending moment in the axle. The construction also lends itself admirably to repairs and adjustments.

I claim:

1. In aircraft landing gear, the combination of an axle, struts having guideways in which both ends of the axle are mounted for up and down movement, and shock-absorbing means comprising a single cable passing around the axle and having leading and trailing runs parallel to the axle and also connected with the struts, and an elastic shock-absorbing unit incorporated in one of the cable runs.

2. In aircraft landing gear, an undercarriage embodying an axle, ground elements and struts, said axle being mounted at both ends in guideways in said struts; and shock-absorbing means embodying a cable passing around the axle adjacent to the struts and having leading and trailing runs parallel to the axle, cable-guiding means on the struts, and an elastic shock-absorbing unit incorporated in the trailing run of said cable.

3. In aircraft landing gear, an undercarriage embodying an axle, ground elements and struts, said axle being mounted at both ends in guideways in said struts; and shock-absorbing means embodying a cable passing around the axle adjacent to the struts and having leading and trailing runs parallel to the axle, cable-guiding means on the struts, an elastic shock-absorbing unit incorporated in the trailing run of said cable, and means for regulating the effective tension of said shock-absorbing unit in said leading run of said cable.

4. In aircraft landing gear, an undercarriage embodying an axle, ground elements and struts, said axle being mounted at both ends in guideways in said struts; and shock-absorbing means embodying a cable passing around the axle adjacent to the struts and having leading and trailing runs parallel to the axle, cable-guiding pulleys on the struts engaging said cable, pulleys on the axle engaging said cable, and a shock-absorbing unit incorporated in the trailing run of said cable.

In testimony whereof I affix my signature.

CHARLES A. LEWIS.